US009577285B2

(12) United States Patent
Chu et al.

(10) Patent No.: US 9,577,285 B2
(45) Date of Patent: Feb. 21, 2017

(54) SOLID ELECTROLYTE, METHOD FOR PREPARING SAME, AND RECHARGEABLE LITHIUM BATTERY COMPRISING SOLID ELECTROLYTE AND SOLID ELECTROLYTE PARTICLES

(75) Inventors: Hee-Young Chu, Yongin-si (KR);
Sung-Hwan Moon, Yongin-si (KR);
Yuri Matulevich, Yongin-si (KR);
Jae-Hyuk Kim, Yongin-si (KR);
Myung-Hwan Jeong, Yongin-si (KR);
Chang-Ui Jeong, Yongin-si (KR);
Jong-Seo Choi, Yongin-si (KR); Oleg Leonidovith Andreev, Ekaterinburg (RU)

(73) Assignee: Samsung SDI Co., Ltd., Gyeonggi-Do (KR)

(*) Notice: Subject to any disclaimer, the term of this patent is extended or adjusted under 35 U.S.C. 154(b) by 1095 days.

(21) Appl. No.: 13/244,106

(22) Filed: Sep. 23, 2011

(65) Prior Publication Data
US 2012/0094186 A1    Apr. 19, 2012

(30) Foreign Application Priority Data

Oct. 15, 2010   (KR) .................. 10-2010-0100750
May 11, 2011   (KR) .................. 10-2011-0044030

(51) Int. Cl.
*H01M 10/0562*  (2010.01)
*H01M 10/0525*  (2010.01)
*C01B 25/45*     (2006.01)

(52) U.S. Cl.
CPC .......... *H01M 10/0525* (2013.01); *C01B 25/45* (2013.01); *H01M 10/0562* (2013.01); *H01M 2300/0068* (2013.01); *Y02E 60/122* (2013.01)

(58) Field of Classification Search
CPC ............... H01M 2300/65; H01M 2300/68; H01M 2300/71; H01M 2300/74; H01M 6/18; H01M 6/185; H01M 10/3471; H01M 2300/69; H01M 10/0562; H01M 10/26; H01M 10/347; H01M 6/188
(Continued)

(56) References Cited

U.S. PATENT DOCUMENTS 5,580,430 A * 12/1996 Balagopal et al. .......... 204/252
7,514,181 B2    4/2009 Ugaji et al.
(Continued)

FOREIGN PATENT DOCUMENTS

JP    10-097860    4/1998
JP    2000-200621    7/2000
(Continued)

OTHER PUBLICATIONS

Kobayashi et al., Densification of LiTi2(PO4)3-based solid electrolytes by spark-plasma-sintering, J. Power Sources, 81-82 (1999) 853-858.*
Xu et al., "Preparation and electrical properties of NASICON-type structured Li1.4Al0.4Ti1.6(PO4)3 glass-ceramics by the citric acid-assisted sol-gel method," Solid State Ionics, 178 (2007) 29-34.*
Nakano et al., "Three-dimensionally ordered composite electrode between LiMn2O4 and Li1.5Al0.5Ti1.5(PO4)3," Ionics (2008) 14; 173-177; Published Online Dec. 19, 2007.*
(Continued)

*Primary Examiner* — Ula C Ruddock
*Assistant Examiner* — Amanda Barrow
(74) *Attorney, Agent, or Firm* — Knobbe Martens Olson & Bear LLP

(57) ABSTRACT

Disclosed is a solid electrolyte including particles comprising $Li_{(1+x)}Ti_{(2-x)}Al_x(PO_4)_3$ (0≤x≤1) having a true density of about 2.20 to about 2.50 g/cm$^3$.

6 Claims, 3 Drawing Sheets

(58) Field of Classification Search
USPC . 429/304, 319, 321, 322; 252/62.2; 264/618
See application file for complete search history.

(56) References Cited

U.S. PATENT DOCUMENTS

| | | | |
|---|---|---|---|
| 2007/0087269 | A1 | 4/2007 | Inda |
| 2007/0231704 | A1* | 10/2007 | Inda .............................. 429/322 |
| 2007/0259271 | A1 | 11/2007 | Nanno et al. |

FOREIGN PATENT DOCUMENTS

| | | |
|---|---|---|
| JP | 2001-143754 | 5/2001 |
| JP | 2001-210375 | 8/2001 |
| JP | 2010-192258 | 9/2010 |
| KR | 10-2008-0044218 | 5/2008 |
| KR | 10-0883044 B1 | 2/2009 |
| KR | 10-2010-0019105 | 2/2010 |
| KR | 10-2010-0033827 | 3/2010 |

OTHER PUBLICATIONS

Xu et al., "Preparation of Nanostructured Li1.4Al0.4Ti1.6(PO4)3 Glass-Ceramics by a Citrate Process," Chemistry Letters vol. 34, No. 4 (2005).*

Mariappan et al., "Grain boundary resistance of fast lithium ion conductors: Comparison between a lithium-ion conductive Li-Al-Ti-P-O (LTAP) type glass ceramic and a Li1.5Al0.5Ge1.5P3O12 ceramic," Electrochemistry Communications, vol. 14, Issue 1, Jan. 2012, pp. 25-28.*

Aono et al., Ionic conductivity of Solid Electrolytes Based on Lithium Titanium Phosphates, J. Electrochem. Soc., vol. 137, No. 4, Apr. 1990, 1023-1027.*

Office Action dated Sep. 24, 2013 in priority Korean Patent Application No. 10-2011-0044030.

Office Action dated Feb. 26, 2013 in Korean Priority Application No. 10-2011-0044030.

Nakano, Hiroyuki et al., "Three-dimensionally ordered composite electrode between LiMn2O4 and Li1.5Al0.5Ti1.5(PO4)3", Ionics, 2008 14:173-177.

* cited by examiner

SOLID ELECTROLYTE, METHOD FOR PREPARING SAME, AND RECHARGEABLE LITHIUM BATTERY COMPRISING SOLID ELECTROLYTE AND SOLID ELECTROLYTE PARTICLES

RELATED APPLICATIONS

This application claims priority to and the benefit of Korean Patent Application Nos. 10-2010-0100750 and 10-2011-0044030, filed in the Korean Intellectual Property Office on Oct. 15, 2010, and May 11, 2011, respectively, the entire contents of which are incorporated herein by reference.

BACKGROUND

Field

This disclosure relates to a solid electrolyte for a rechargeable lithium battery, a method for preparing the same, a rechargeable lithium battery including the same, and solid electrolytes particles.

Description of the Related Technology

An aspect of the present invention is to provide a battery pack which includes an explosion prevention part containing ionic materials to improve safety.

Lithium rechargeable batteries have recently drawn attention as a power source of small portable electronic devices. Lithium rechargeable batteries typically use organic electrolyte solutions and thereby have twice the discharge voltage of a conventional battery using alkali aqueous solutions, and accordingly have high energy density.

However, since organic electrolyte solutions causes problems of safety in the rechargeable lithium battery, all-solid batteries that do not use organic electrolyte solutions have drawn much attention. The most important feature in the all-solid battery is a solid electrolyte, and the solid electrolyte may be broadly divided into polymer solid electrolytes and ceramic solid electrolytes.

The conventional ceramic solid electrolyte may generally be synthesized by a solid-phase method. When the ceramic solid electrolyte is synthesized by a solid-phase method, it incurs certain disadvantages. For example, a complex phase is synthesized, and the heating temperature is increased to coarsen the grain, and when the mixing state of starting material is not homogeneous, non-reacted phases are easily generated. In addition, the material synthesized by a solid-phase method has a high porosity and grain boundary resistance, so it deteriorates the ionic conductivity.

SUMMARY

One aspect provides a ceramic solid electrolyte having a high ionic conductivity.

Another aspect provides a method of manufacturing a ceramic solid electrolyte having a high ionic conductivity.

Further another aspect provides a rechargeable lithium battery including a ceramic solid electrolyte having a high ionic conductivity.

Further another aspect provides solid electrolyte particles.

According to one aspect of the present invention, a solid electrolyte including a $Li_{(1+x)}Ti_{(2-x)}Al_x(PO_4)_3$ ($0 \leq x \leq 1$) particle having a true density of about 2.20 g/cm³ to about 2.50 g/cm³.

The true density to the theoretical density of $Li_{(1+x)}Ti_{(2-x)}Al_x(PO_4)_3$ ($0 \leq x \leq 1$) particle may range from about 77 to about 80 volume %.

The $Li_{(1+x)}Ti_{(2-x)}Al_x(PO_4)_3$ ($0 \leq x \leq 1$) particles may be in a powder.

The $Li_{(1+x)}Ti_{(2-x)}Al_x(PO_4)_3$ ($0 \leq x \leq 1$) particles may be formed according to a sol-gel method.

The primary particle synthesized by the sol-gel method may have a particle size distribution of D50 of about 250 nm to about 500 nm and of D90 of about 350 nm to about 700 nm.

The solid electrolyte may have a ionic conductivity of about $2.33 \times 10^{-4}$ S/cm to about $2.43 \times 10^{-4}$ S/cm at a room temperature.

Another embodiment provides a rechargeable lithium battery including a negative electrode including a negative active material; a positive electrode including a positive active material; and the solid electrolyte.

Another embodiment provides a method of preparing $Li_{(1+x)}Ti_{(2-x)}Al_x(PO_4)_3$ ($0 \leq x \leq 1$) particle for a solid electrolyte including mixing a first mixed solution including a lithium source material and a $PO_4$ source material, and a second mixed solution including alcohol, a chelating agent and titanium alkoxide; heating the mixture at about 40° C. to about 80° C. to provide a chelate/metal sol; heating the sol at 200° C. to 300° C. to provide a gel precursor; and firing the gel precursor at 650° C. to 950° C.

The first mixed solution may further include an aluminum source material.

Another embodiment provides a $Li_{(1+x)}Ti_{(2-x)}Al_x(PO_4)_3$ ($0 \leq x \leq 1$) particle for a solid electrolyte prepared by the method.

The $Li_{(1+x)}Ti_{(2-x)}Al_x(PO_4)_3$ ($0 \leq x \leq 1$) particle for a solid electrolyte has a true density of about 2.20 g/cm³ to about 2.50 g/cm³.

The $Li_{(1+x)}Ti_{(2-x)}Al_x(PO_4)_3$ ($0 \leq x \leq 1$) particle for a solid electrolyte has the true density to the theoretical density of about 77 to about 80 volume %.

It may provide a $Li_{(1+x)}Ti_{(2-x)}Al_x(PO_4)_3$ ($0 \leq x \leq 1$) particle for a solid electrolyte with an improved ionic conductivity, and the rechargeable lithium battery including the same may be fabricated in a simplified process since the process of grinding a solid electrolyte particle is not required.

DETAILED DESCRIPTION

Figure 1:
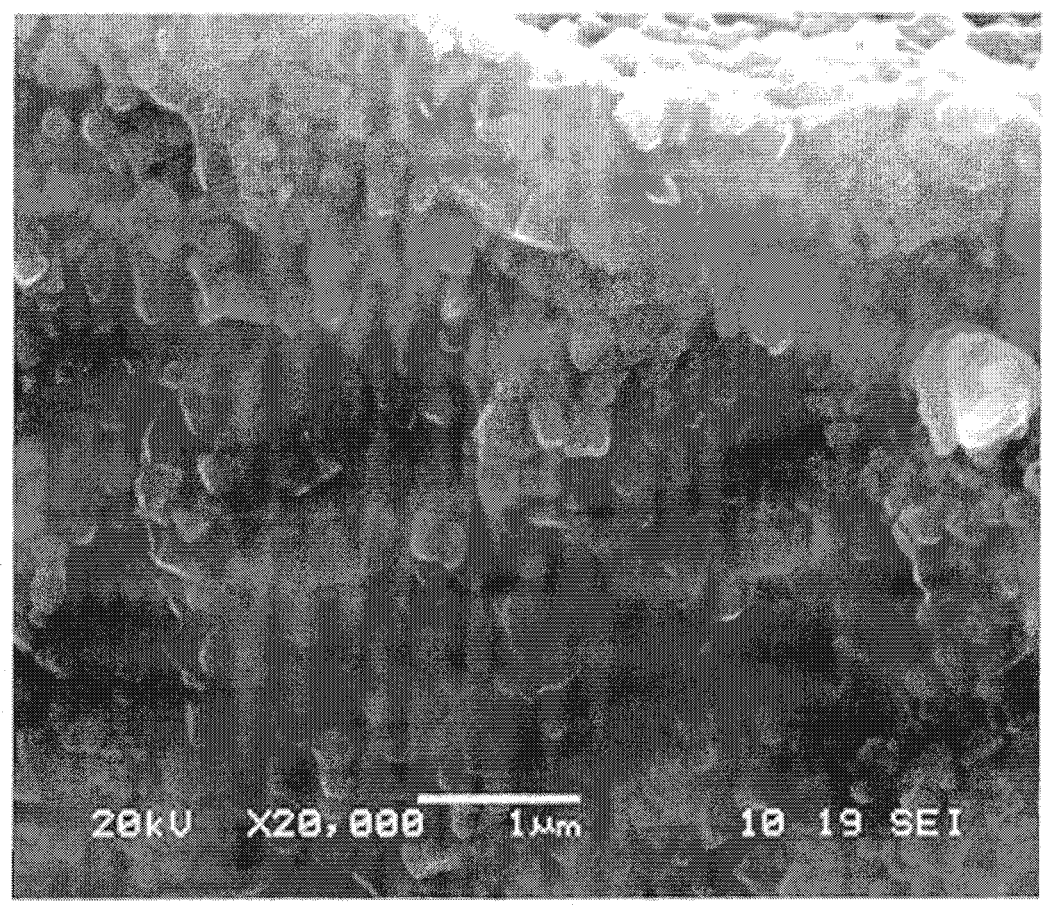
FIG. 1 is a SEM photograph of $Li_{1.3}Ti_{1.7}Al_{0.3}(PO_4)_3$ particle synthesized by Examples described herein.

Embodiments of the present invention will be described more fully hereinafter with reference to the accompanying drawings, in which embodiments of the invention are shown.

According to one embodiment, $Li_{(1+x)}Ti_{(2-x)}Al_x(PO_4)_3$ ($0 \leq x \leq 1$) particles for a solid electrolyte may have a true density of about 2.20 to about 2.50 g/cm³.

$Li_{(1+x)}Ti_{(2-x)}Al_x(PO_4)_3$ ($0 \leq x \leq 1$) particles for a solid electrolyte may be synthesized according to the sol-gel method.

Another embodiment provides a method of preparing $Li_{(1+x)}Ti_{(2-x)}Al_x(PO_4)_3$ ($0 \leq x \leq 1$) particles for a solid electrolyte, which includes mixing a first mixed solution including a lithium source material and a $PO_4$ source material, and a second mixed solution including alcohol, a chelating agent and titanium alkoxide; heating the mixture at about 40° C. to about 80° C. to provide a chelate/metal sol; heating the sol at about 200° C. to about 300° C. to provide a gel precursor; and firing the gel precursor at about 650° C. to about 950° C.

The first mixed solution may further include an aluminum source material. When the first mixed solution includes the aluminum source material, $Li_{(1+x)}Ti_{(2-x)}Al_x(PO_4)_3$ ($0 \leq x \leq 1$) particles for a solid electrolyte may be obtained. Alternatively, when the first mixed solution does not include the aluminum source material, $LiTi_2(PO_4)_3$ particles ($Li_{(1+x)}Ti_{(2-x)}Al_x(PO_4)_3$, wherein x is 0, may be obtained.

The first mixed solution may include water as a solvent for dissolving the source materials, lithium source materials, and a $PO_4$ source material, and alternatively, may include water and $HNO_3$ at a predetermined ratio. That is, the first mixed solution may be an aqueous solution.

For example, the firing temperature may range from about 750° C. to about 800° C.

Since the manufacturing method may be performed at a relatively low process temperature, the particle size may be smaller than that performing at a high temperature process.

The lithium source material may be lithium hydroxide, lithium nitrate, lithium carbonate.

The $PO_4$ source material may be phosphate compounds such as $NH_4H_2PO_4$, $(NH_4)_2HPO_4$, $(NH_4)_3PO_4$, $H_3PO_4$, or a combination thereof.

The aluminum source material may be $Al(NO_3)_3 \cdot 9H_2O$.

The alcohol in the second mixed solution may be methanol, ethanol, etc.

The chelating agent in the second mixed solution may be at least one of ammonia, ethylene diamine, acetic acid, or acetyl acetone.

The titanium alkoxide may be titanium methoxide, titanium ethoxide, titanium propoxide, titanium butoxide, or a combination thereof.

According to another embodiment, the primary particle synthesized from the sol-gel method may have a particle size distribution of "D50" ranging from about 250 nm to about 500 nm, and of "D90" ranging from about 350 nm to about 700 nm. D50 refers to a 50%-point accumulation particle size distribution; and D90 refers to a 90%-point accumulation particle size distribution. D50 also indicates a particle size when an active material particle with various particle sizes of 0.1, 0.2, 0.3 . . . 3, 5, 7 . . . 10, 20, 30 μm, etc., is accumulated up to about 50%, and D90 indicates a particle size when an active material particle with various particle sizes of 0.1, 0.2, 0.3 . . . 3, 5, 7 . . . 10, 20, 30 μm, etc., is accumulated up to about 90%.

As in the above, since $Li_{(1+x)}Ti_{(2-x)}Al_x(PO_4)_3$ ($0 \leq x \leq 1$) particles for a solid electrolyte synthesized from the manufacturing method according to embodiments have a small particle size, it is preferable to provide a powder layer with a high density. In addition, a manufacturing method according to embodiments may provide particles having a size smaller than that synthesized by a solid-phase method to allow denser sintering, so the manufacturing method may provide $Li_{(1+x)}Ti_{(2-x)}Al_x(PO_4)_3$ ($0 \leq x \leq 1$) particles having a true density within the range.

The solid electrolyte including the obtained $Li_{(1+x)}Ti_{(2-x)}Al_x(PO_4)_3$ ($0 \leq x \leq 1$) particles can improve the ionic conductivity, since the solid electrolyte has the low grain boundary resistance.

The $Li_{(1+x)}Ti_{(2-x)}Al_x(PO_4)_3$ ($0 \leq x \leq 1$) particles synthesized by a method according to embodiments are formed uniformly and in small sizes, so that the packing is enhanced to provide $Li_{(1+x)}Ti_{(2-x)}Al_x(PO_4)_3$ ($0 \leq x \leq 1$) particles with a true density (i.e., the density of the particles that make up a powder) to theoretical density (i.e., the bulk density of the material) ranging from about 77 volume % to about 80 volume %.

According to another embodiment, the solid electrolyte including the $Li_{(1+x)}Ti_{(2-x)}Al_x(PO_4)_3$ ($0 \leq x \leq 1$) particles may have an ionic conductivity ranging from about $2.33 \times 10^{-4}$ S/cm to about $2.43 \times 10^{-4}$ S/cm at room temperature (e.g., about 25° C.).

Another embodiment provides a rechargeable lithium battery that includes a negative electrode including a negative active material; a positive electrode including a positive active material; and a solid electrolyte including the $Li_{(1+x)}Ti_{(2-x)}Al_x(PO_4)_3$ ($0 \leq x \leq 1$) particles.

Since the solid electrolyte according to embodiments have improved ionic conductivity, it may enhance the charge and discharge characteristics of rechargeable lithium batteries, such as excellent capacity and improved cycle-life characteristic, when used as a solid electrolyte for an all-solid battery. Particularly, since the solid electrolyte according to embodiments has a small particle size, it can facilitate enlarging the contact area with the active material and to expand the ion transferring passage, which is favorable for charge and discharge.

Even for battery systems that are not all-solid batteries, solid electrolytes according to embodiments may be applied as the coating layer for reducing side reactions of the material surface and to enhance ionic conductivity when coated on the material surface in the battery.

The negative electrode may include a current collector and a negative active material layer disposed on the current collector. The negative active material layer may include a negative active material.

The negative active material may include a material that reversibly intercalates/deintercalates lithium ions, a lithium metal, a lithium metal alloy, a material capable of doping and de-doping lithium, a material being capable of reacting with lithium ions to form a lithium-containing compound, or a transition metal oxide.

The material that reversibly intercalates/deintercalates lithium ions may include a carbon material. The carbon material may be any conventional carbon-based negative active material generally used in lithium ion rechargeable batteries. Examples of the carbon material may include crystalline carbon, amorphous carbon, and mixtures thereof. The crystalline carbon may be amorphously shaped, or have a sheet-like, flake-like, spherical, or fiber-shaped natural graphite or artificial graphite. The amorphous carbon may be a soft carbon, a hard carbon, meso-phase pitch carbide, fired coke, and the like.

Examples of the lithium metal alloy include lithium, and a metal selected from the group consisting of Na, K, Rb, Cs, Fr, Be, Mg, Ca, Sr, Si, Sb, Pb, In, Zn, Ba, Ra, Ge, Al, and Sn.

Examples of the material capable of doping and de-doping lithium may include Si, $SiO_x$ ($0 < x < 2$), a Si-M alloy (wherein M is an alkali metal, an alkaline-earth metal, a group 13 element of the Periodic table, a group 14 element, a group 15 element, a group 16 element, a transition element, a rare earth element, or a combination thereof, but not Si), Sn, $SnO_2$, a Sn-M alloy (wherein M is an alkali metal, an alkaline-earth metal, a group 13 element, a group 14 element, a group 15 element, a group 16 element, a transition element, a rare earth element, or a combination thereof, but not Sn), and the like. At least one of these materials may be mixed with $SiO_2$. The element M may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, and the like.

The negative active material layer may include a binder, and optionally may further include a conductive material.

The binder can improve the binding properties of the negative active material particles to each other and to a current collector. Examples of the binder include at least one selected from the group consisting of polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon and the like, but are not limited thereto.

Any electrically conductive material may be used as a conductive material, unless the material causes a chemical change. Examples of the conductive material include: carbon-based materials such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; and mixtures thereof.

The current collector may include a copper foil, a nickel foil, a stainless steel foil, a titanium foil, a nickel foam, a copper foam, a polymer substrate coated with a conductive metal, and combinations thereof.

The positive electrode may include a current collector and a positive active material layer disposed on the current collector.

The positive active material may include lithiated intercalation compounds that reversibly intercalate and deintercalate lithium ions. The positive active material may include a composite oxide including at least one selected from the group consisting of cobalt, manganese, and nickel, as well as lithium. In particular, the following lithium-containing compounds may be used: $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}CO_bR_cO_{2-\alpha}Z_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-e}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ ($0.90 \leq a \leq 1.8$ and $0.001 \leq b \leq 0.1$.); $Li_aCoG_bO_2$ ($0.90 \leq a \leq 1.8$ and $0.001 \leq b \leq 0.1$.); $Li_aMnG_bO_2$ ($0.90 \leq a \leq 1.8$ and $0.001 \leq b \leq 0.1$.); $Li_aMn_2G_bO_4$ ($0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compound may have a coating layer on the surface, or may be mixed with a compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compounds for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no negative influence on properties of a positive active material by including these elements in the compound. For example, the method may include any coating method such as spray coating, dipping, and the like, but is not illustrated in more detail, since it is well-known to those who work in the related field.

The positive active material layer may include a binder and a conductive material.

The binder can improve binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may be used to improve the conductivity of an electrode. Any electrically conductive material may be used as a conductive material unless it causes a chemical change. Examples of the conductive material include one or more of natural graphite, artificial graphite, carbon black, acetylene black, ketjen black, a carbon fiber, a metal powder or a metal fiber including copper, nickel, aluminum, silver, and so on, and a polyphenylene derivative.

The current collector may be Al, but is not limited thereto.

The negative and positive electrodes may be fabricated by a method including mixing the active material, a conductive material, and a binder into an active material composition, and coating the composition on a current collector, respectively. The electrode manufacturing method is well known, and thus is not described in detail in the present specification. The solvent includes N-methylpyrrolidone and the like, but is not limited thereto.

The electrolyte may be a solid electrolyte described above.

The rechargeable lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The rechargeable lithium battery may be manufactured by the known method without the specific limitation. For example, an active material composition may be coated on a positive current collector and dried to provide a positive active material layer and to provide a positive electrode. Separately, the negative active material of a lithium metal or a lithium alloy may be roll-pressed on a negative electrode current collector to provide a negative active material layer and to provide a negative electrode. The solid electrolyte may be interposed between the positive electrode and the negative electrode, and may be laminated in this order and sealed under the vacuum condition to provide a rechargeable lithium battery.

The following examples illustrate this disclosure in more detail. These examples, however, are not in any sense to be interpreted as limiting the scope of this disclosure.

Example 1

0.961 g of $Li_2CO_3$, 2.251 g of $Al(NO_3)_3 \cdot 9H_2O$, and 7.923 g of $NH_4H_2PO_4$ were dissolved in 7 ml of $HNO_3$ to provide a metal salt aqueous solution. On the other hand, 9 ml of ethanol, 3 ml of acetyl acetone, and 11.57 g of $Ti(OC_4H_9)_4$ were mixed to provide a mixed solution and mixed with the metal salt aqueous solution. The mixture was heated at 80° C. to provide a chelate/metal sol. The obtained sol was heated at 300° C. to provide a gel precursor. The gel precursor was fired at 950° C. to provide a $Li_{1.3}Ti_{1.7}Al_{0.3}(PO_4)_3$ particle powder for a solid electrolyte. The resulting $Li_{1.3}Ti_{1.7}Al_{0.3}(PO_4)_3$ particle powder had a particle size distribution of D50 of about 250 nm to about 500 nm and of D90 of about 350 nm to about 700 nm.

FIG. 1 is a SEM photograph of $Li_{1.3}Ti_{1.7}Al_{0.3}(PO_4)_3$ powder obtained from Example 1.

Comparative Example 1

15.3 g of $Al(NO_3)_3$, 135.8 g of $TiO_2$, 396.2 g of $NH_4H_2PO_4$, and 48.0 g of $Li_2CO_3$ were mixed to provide a mixture, and then the mixture was dried at 300° C. for 48 hours and first annealed at 900° C. for 2 hours and secondary annealed at 1100° C. for 2 hours to provide a $Li_{1.3}Ti_{1.7}Al_{0.3}(PO_4)_3$ powder.

Figure 2:
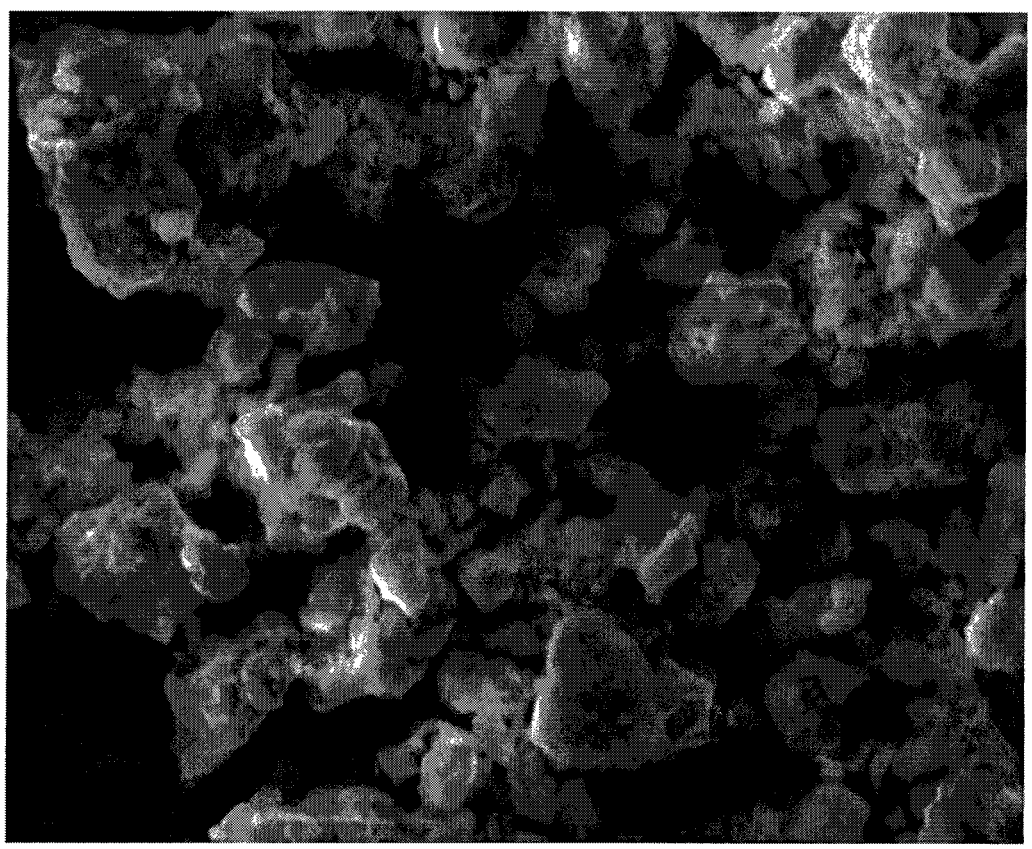
FIG. 2 is a SEM photograph of $Li_{1.3}Ti_{1.7}Al_{0.3}(PO_4)_3$ particle synthesized by the Comparative Example described herein.

FIG. 2 is a SEM photograph of $Li_{1.3}Ti_{1.7}Al_{0.3}(PO_4)_3$ powder obtained from Comparative Example 1.

Figure 3:
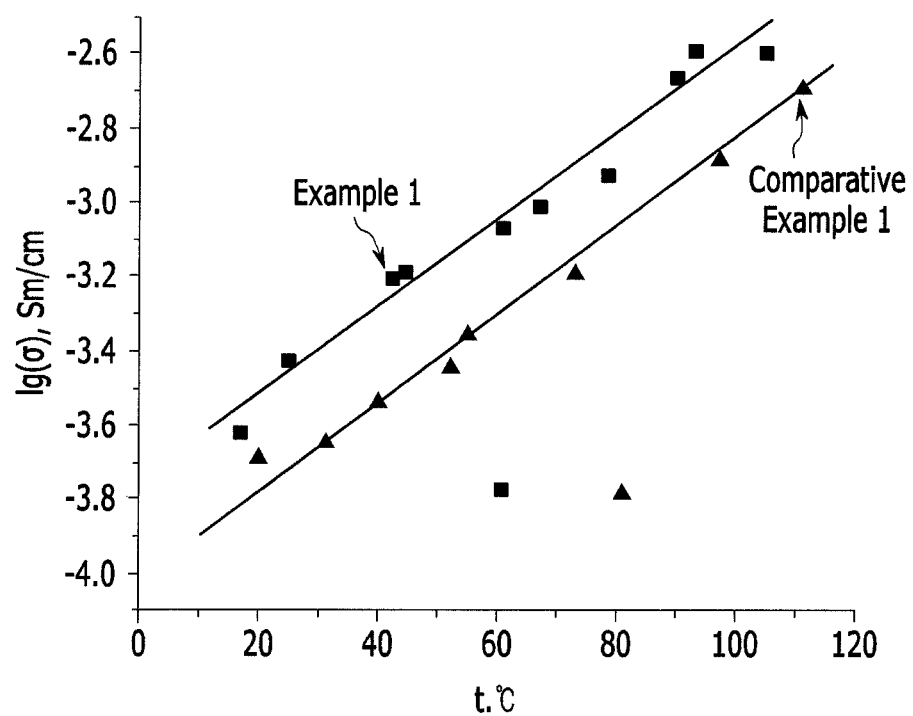
FIG. 3 is a graph showing the ionic conductivity of $Li_{1.3}Ti_{1.7}Al_{0.3}(PO_4)_3$ synthesized by Examples and the Comparative Examples described herein.

The $Li_{1.3}Ti_{1.7}Al_{0.3}(PO_4)_3$ powder obtained from Example 1 and Comparative Example 1 was measured for an ionic conductivity according to the temperature using LCR meter HP4194 A. The results are shown in FIG. 3.

The powder particle synthesized from Example 1 has a true density of 2.35 g/cm³; and the powder particle synthesized from Comparative Example 1 has a true density of 2.13 g/cm³. The theoretical density of LTAP is about 2.984 g/cm³, so the true density of powder obtained by the sol-gel method from Example 1 has a true density with respect to the theoretical density of about 79%; and the powder obtained from Comparative Example 1 has a true density to the theoretical density of 71%. Thereby, it is confirmed that the case synthesized by the sol-gel method improves the density.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A solid electrolyte comprising:
particles comprising $Li_{(1+x)}Ti_{(2-x)}Al_x(PO_4)_3$ (0.3≤x≤1) having a true density of 2.20 g/cm³ to 2.50 g/cm³;
wherein the $Li_{(1+x)}Ti_{(2-x)}Al_x(PO_4)_3$ (0.3≤x≤1) particle is formed by a sol-gel method;
wherein the method includes:
mixing a first mixed solution with a second mixed solution to provide a mixture, the first mixed solution including a lithium source material and a $PO_4$ source material, and the second mixed solution including alcohol, a chelating agent and titanium alkoxide,
heating the mixture at about 40° C. to about 80° C. to provide a chelate/metal sol;
heating the chelate/metal sol at about 200° C. to about 300° C. to provide a gel precursor; and
firing the gel precursor at about 650° C. to about 950° C.; and further
wherein the chelating agent in the second mixed solution may be at least one of ammonia, ethylene diamine, acetic acid, or acetyl acetone; and further
wherein the primary particle synthesized by the sol-gel method has a particle size distribution at 50%-point accumulation ranging from about 250 nm to about 500 nm, and a particle size distribution at 90%-point accumulation ranging from about 350 nm to about 700 nm; and
wherein the solid electrolyte has an ionic conductivity of about 2.33×10⁻⁴ S/cm to about 2.43×10⁻⁴ S/cm at a temperature of about 25° C.

2. The solid electrolyte of claim 1, wherein the $Li_{(1+x)}Ti_{(2-x)}Al_x(PO_4)_3$ (0.3≤x≤1) particles have a percentage of true density to the theoretical density ranging from about 77 volume % to about 80 volume %.

3. The solid electrolyte of claim 1, wherein the $Li_{(1+x)}Ti_{(2-x)}Al_x(PO_4)_3$ (0.3≤x≤1) particles are in a powder.

4. A rechargeable lithium battery comprising
a negative electrode including a negative active material;
a positive electrode including a positive active material;
a solid electrolyte comprising particles comprising $Li_{(1+x)}Ti_{(2-x)}Al_x(PO_4)_3$ (0.3≤x≤1) having a true density of 2.20 g/cm³ to 2.50 g/cm³;
wherein the $Li_{(1+x)}Ti_{(2-x)}Al_x(PO_4)_3$ (0.3≤x≤1) particle is formed by a sol-gel method;
wherein the method includes:
mixing a first mixed solution with a second mixed solution to provide a mixture, the first mixed solution including a lithium source material and a PO4 source material, and the second mixed solution including alcohol, a chelating agent and titanium alkoxide,
heating the mixture at about 40° C. to about 80° C. to provide a chelate/metal sol;
heating the chelate/metal sol at about 200° C. to about 300° C. to provide a gel precursor; and
firing the gel precursor at about 650° C. to about 950° C.; and further
wherein the chelating agent in the second mixed solution may be at least one of ammonia, ethylene diamine, acetic acid, or acetyl acetone; and further
wherein the primary particle synthesized by the sol-gel method has a particle size distribution at 50%-point accumulation ranging from about 250 nm to about 500 nm, and a particle size distribution at 90%-point accumulation ranging from about 350 nm to about 700 nm; and wherein the solid electrolyte has an ionic conductivity of about $2.33 \times 10^{-4}$ S/cm to about $2.43 \times 10^{-4}$ S/cm at a temperature of about 25° C.

5. The rechargeable lithium battery of claim 4, wherein the $Li_{(1+x)}Ti_{(2-x)}Al_x(PO_4)_3$ ($0.3 \leq x \leq 1$) particles have a percentage of true density to the theoretical density ranging from about 77 volume % to about 80 volume %.

6. The rechargeable lithium battery of claim 4, wherein the $Li_{(1+x)}Ti_{(2-x)}Al_x(PO_4)_3$ ($0.3 \leq x \leq 1$) particles are in a powder.

* * * * *